(12) United States Patent
Atchison et al.

(10) Patent No.: US 10,663,936 B2
(45) Date of Patent: May 26, 2020

(54) REMOTE CLEAR OF AN HVAC SYSTEM

(71) Applicant: Johnson Controls Technology Company, Auburn Hills, MI (US)

(72) Inventors: Shaun B. Atchison, Wichita, KS (US); Brian D. Rigg, Douglass, KS (US)

(73) Assignee: Johnson Controls Technology Company, Auburn Hills, MI (US)

(*) Notice: Subject to any disclaimer, the term of this patent is extended or adjusted under 35 U.S.C. 154(b) by 31 days.

(21) Appl. No.: 15/920,139

(22) Filed: Mar. 13, 2018

(65) Prior Publication Data
US 2019/0265662 A1   Aug. 29, 2019

Related U.S. Application Data

(60) Provisional application No. 62/635,997, filed on Feb. 27, 2018.

(51) Int. Cl.
*G05B 19/042* (2006.01)
*F24F 11/64* (2018.01)
*H04L 29/06* (2006.01)
*F24F 11/58* (2018.01)
*F24F 11/32* (2018.01)
*F24F 11/52* (2018.01)
*F24F 11/57* (2018.01)
*F24F 11/56* (2018.01)

(52) U.S. Cl.
CPC .......... *G05B 19/042* (2013.01); *F24F 11/32* (2018.01); *F24F 11/52* (2018.01); *F24F 11/56* (2018.01); *F24F 11/57* (2018.01); *F24F 11/58* (2018.01); *F24F 11/64* (2018.01); *H04L 63/08* (2013.01); *G05B 2219/2614* (2013.01)

(58) Field of Classification Search
CPC .......... G05B 19/042; G05B 2219/2614; F24F 11/57; F24F 11/52; F24F 11/64; F24F 11/58; F24F 11/32; H04L 63/08
See application file for complete search history.

(56) References Cited

U.S. PATENT DOCUMENTS

| | | | |
|---|---|---|---|
| 8,002,236 B2 | 8/2011 | Myers | |
| 8,020,780 B2 | 9/2011 | Schultz et al. | |
| 8,214,060 B2 | 7/2012 | Bartels et al. | |
| 9,500,366 B2 | 11/2016 | Kadah et al. | |
| 2012/0109384 A1* | 5/2012 | Stepanian | G06F 21/10 700/275 |
| 2014/0176303 A1* | 6/2014 | Stratton | G08C 17/02 340/5.61 |
| 2014/0316585 A1* | 10/2014 | Boesveld | G05D 23/1902 700/278 |

(Continued)

*Primary Examiner* — Yuhui R Pan
(74) *Attorney, Agent, or Firm* — Fletcher Yoder, P.C.

(57) ABSTRACT

The present disclosure is directed to a system for a heating, ventilating, and air conditioning (HVAC) system includes a control system of the HVAC system, a user device configured to be communicatively coupled to the control system and receive feedback indicative of a lock out event of the HVAC system, where the lock out event is configured to effectuate at least a partial shutdown of the HVAC system, and a dealer device configured to receive authorization from the user device to remotely clear the lock out event of the HVAC system, where the dealer device is configured to remotely clear the lock out event upon receiving the authorization from the user device.

20 Claims, 6 Drawing Sheets

(56) References Cited

U.S. PATENT DOCUMENTS

| | | |
|---|---|---|
| 2015/0213989 A1 | 7/2015 | Kasprzycki et al. |
| 2016/0217674 A1 | 7/2016 | Stewart et al. |
| 2017/0307240 A1 | 10/2017 | Fess |

* cited by examiner

REMOTE CLEAR OF AN HVAC SYSTEM

CROSS REFERENCE TO RELATED APPLICATIONS

This application claims priority from and the benefit of U.S. Provisional Application Ser. No. 62/635,997, entitled "REMOTE CLEAR OF AN HVAC SYSTEM," filed Feb. 27, 2018, which is hereby incorporated by reference in its entirety for all purposes.

BACKGROUND

The present disclosure relates generally to environmental control systems, and more particularly, to a system for remotely clearing a lock out event of a heating, ventilation, and air conditioning (HVAC) system.

Environmental control systems are utilized in residential, commercial, and industrial environments to control environmental properties, such as temperature and humidity, for occupants of the respective environments. The environmental control system may control the environmental properties through control of an airflow delivered to the environment. In some cases, an HVAC system may include various control features that block operation of components of the HVAC system upon detection of irregular operating parameters by sensors of the HVAC system. For instance, irregular temperatures and/or pressures within conduits of the HVAC system may trigger a lock out event, which blocks operation of certain components of the HVAC system, such as a compressor or fan. Typically, a technician or a dealer of the HVAC system must physically visit a residence or building where the HVAC system is installed to clear the lock out event, thereby increasing maintenance costs of the HVAC system for both an owner or user of the HVAC system and the dealer.

DRAWINGS

Figure 1:
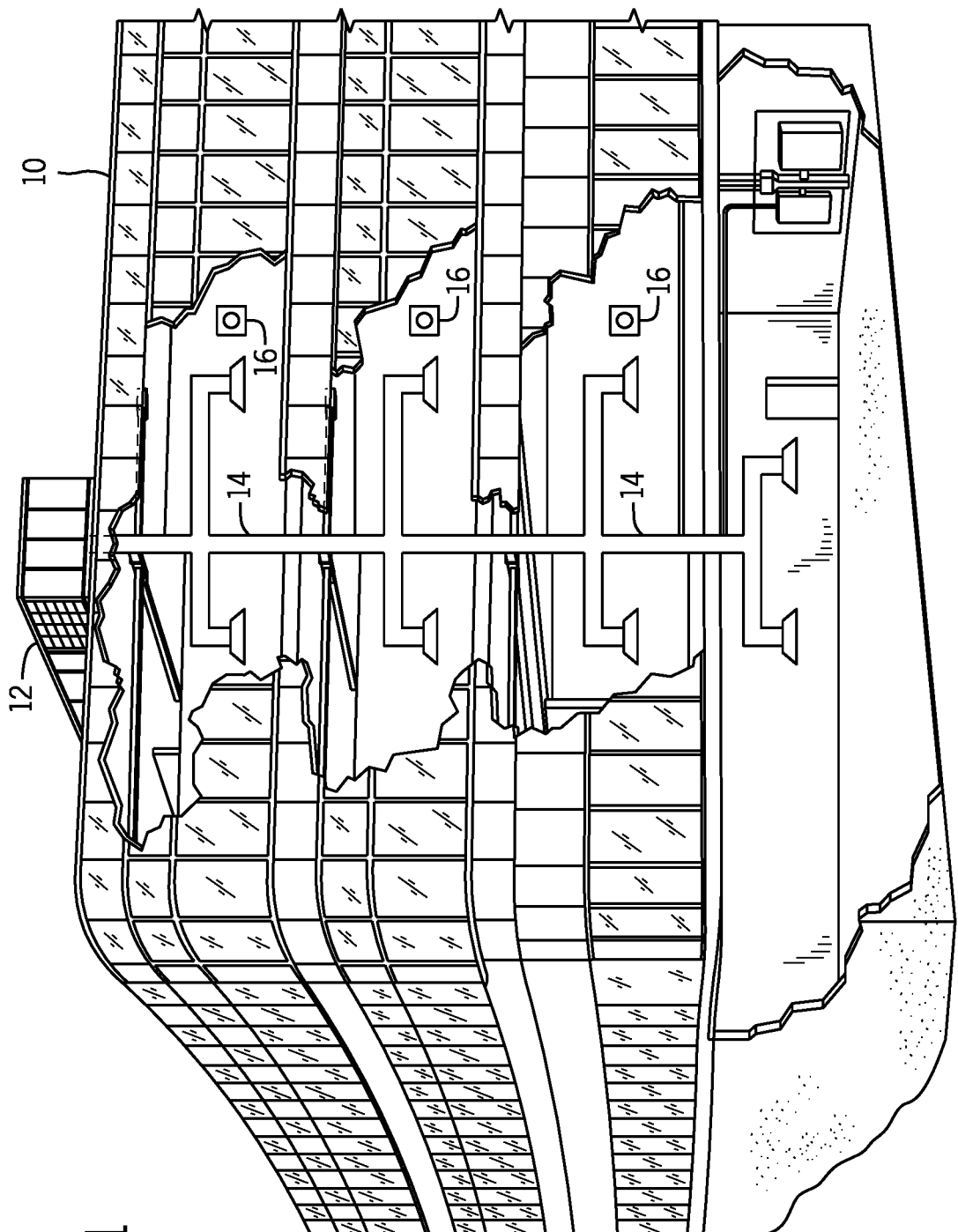
FIG. 1 is a schematic of an environmental control for building environmental management that may employ an HVAC unit, in accordance with an aspect of the present disclosure.
Figure 3:
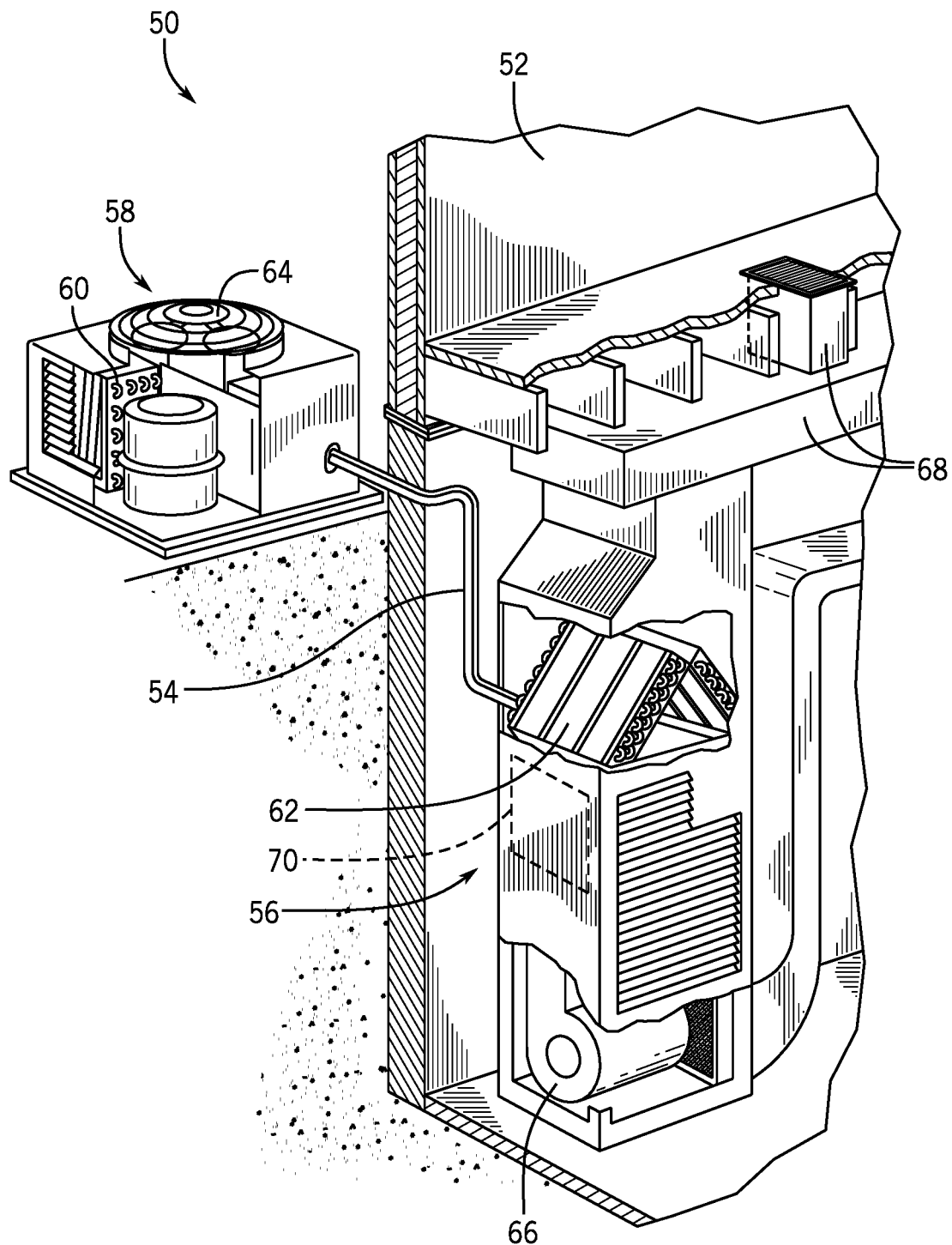
FIG. 3 is a schematic of a residential heating and cooling system, in accordance with an aspect of the present disclosure.
Figure 5:
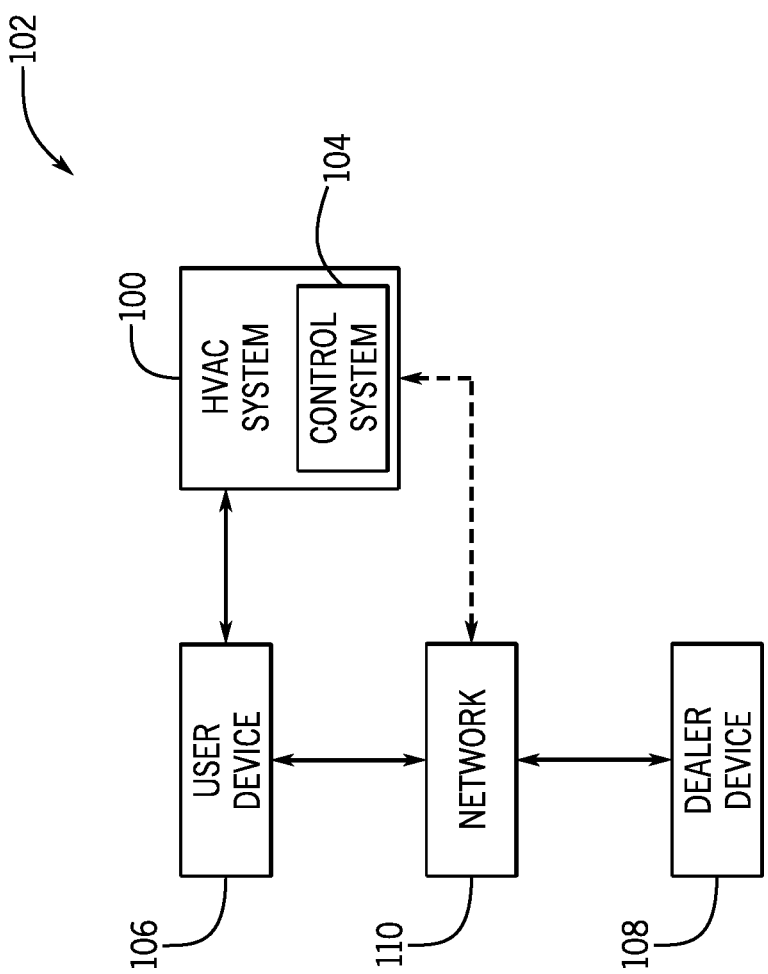
Figure 6:
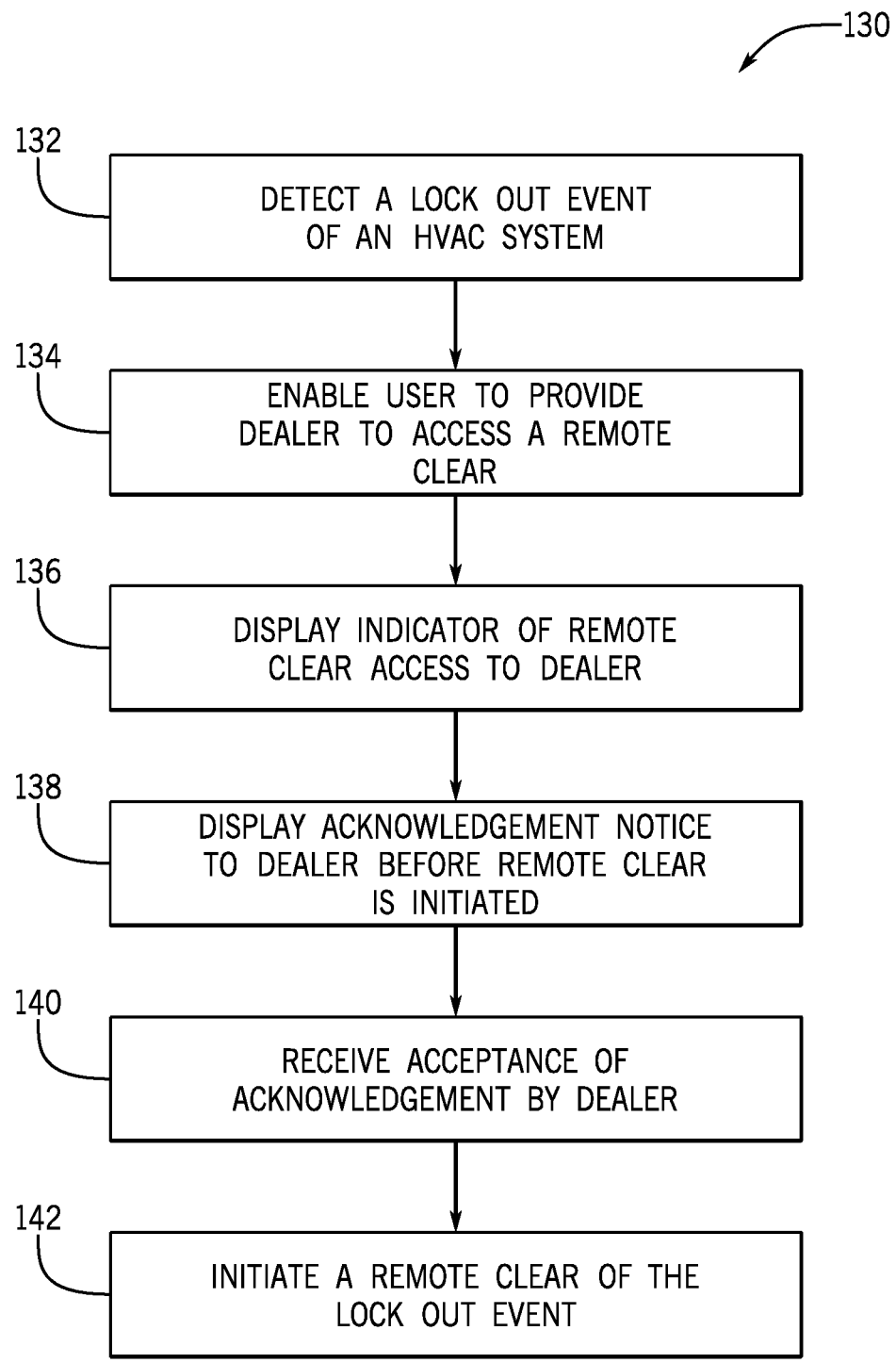

FIG. 5 is a schematic of an embodiment of a system for performing a remote clear of the HVAC unit of FIG. 1 and/or the residential heating and cooling system of FIG. 3, in accordance with an aspect of the present disclosure; and FIG. 6 is a block diagram of an embodiment of a process for performing the remote clear of the HVAC unit and/or the residential heating and cooling system using the system of FIG. 5, in accordance with an aspect of the present disclosure.

SUMMARY

In one embodiment of the present disclosure, a system for a heating, ventilating, and air conditioning (HVAC) system includes a control system of the HVAC system, a user device configured to be communicatively coupled to the control system and receive feedback indicative of a lock out event of the HVAC system, where the lock out event is configured to effectuate at least a partial shutdown of the HVAC system, and a dealer device configured to receive authorization from the user device to remotely clear the lock out event of the HVAC system, where the dealer device is configured to remotely clear the lock out event upon receiving the authorization from the user device.

In another embodiment of the present disclosure, a method for remote clearing a heating, ventilation, and air conditioning (HVAC) system includes detecting a lock out event of the HVAC system, enabling a user to provide a dealer with access to remotely clear the lock out event using a user device, displaying a remote clear request to the dealer on a dealer device, and initiating a remote clearing of the lock out event when the dealer accepts the remote clear request.

In a further embodiment of the present disclosure, a control system for a heating, ventilating, and air conditioning (HVAC) system includes one or more tangible, non-transitory, machine readable media configured to store instructions executable by a processor, where the instructions are configured to detect a lock out event of the HVAC system, enable a user to provider a dealer with authorization to perform a remote clearing of the lock out event using a user device, display an indicator of remote clear access to the dealer on a dealer device, display an acknowledgement notice to the dealer related to initiation of the on the dealer device, receive acceptance of the acknowledgement notice by the dealer, and initiate a remote clearing of the lock out event upon acceptance of the acknowledgement notice.

Other features and advantages of the present application will be apparent from the following, more detailed description of the embodiments, taken in conjunction with the accompanying drawings which illustrate, by way of example, the principles of the application.

DETAILED DESCRIPTION

The present disclosure is directed to a remote clearing system for heating, ventilation, and air conditioning (HVAC) systems that experience a lock out event. As used herein, a lock out event may refer to a partial or full shutdown of the HVAC system. For instance, the lock out event may include both a soft lock out and a hard lock out. A soft lock out may refer to a partial shutdown of the HVAC system that provides the HVAC system with an opportunity to remedy irregular operation that led to the soft lock out. Additionally, a hard lock out may refer to a partial or full shutdown that typically requires a technician or a dealer of the HVAC system to clear before the HVAC system may continue with normal operation or operation without any components shutdown or operating irregularly. In some embodiments, hard lock outs may occur after the HVAC system experiences multiple soft lock outs over a predetermined period of time. In other embodiments, hard lock outs may occur based on a severity of the operating conditions of the HVAC system when compared to soft lock outs. Further, as used herein a remote clear, or remote clearing, refers to a dealer, technician, or other suitable/authorized person to override the lock out event and enable the HVAC system to continue with normal operation without being present at the physical location of the HVAC system.

Embodiments of the present disclosure are directed to a remote clearing system that enables dealers of the HVAC system to clear a lock out, such as a hard lock out or a soft lock out, without being physically present at the location of the HVAC system. For instance, the HVAC system may include a control system that receives feedback from sensors disposed within and configured to monitor operating parameters of the HVAC system. The control system may also be communicatively coupled to a user device, such as a mobile phone, a tablet, a smart wearable device, a voice-activated computing device, a laptop computer, a desktop computer, another suitable computing device, or a combination thereof. As such, the control system sends an indicator to the user device when a lock out event, such as a hard lock out or a soft lock out, occurs.

A user of the user device may provide access to the dealer to remote clear the lock out event. Upon granting access to the dealer, an indication may be directed to the dealer to enable the dealer to remotely clear the lock out event. In some embodiments, the indication includes information related to the HVAC system and/or the lock out event to enable the dealer to assess a condition of the HVAC system and determine whether a remote clear of the lock out event is appropriate. Additionally, the dealer may be provided with an acknowledgement notice related to the remote clear of the lock out event. As such, the lock out event may be cleared remotely after the dealer confirms acceptance of the acknowledgement notice. In some embodiments, the control system of the HVAC unit is configured to store data related to each lock out event and/or each remote clearing of a lock out event, which may be utilized to assess the condition of the HVAC system during future lock out events.

Turning now to the drawings, FIG. 1 illustrates a heating, ventilating, and air conditioning (HVAC) system for building environmental management that may employ one or more HVAC units. In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single packaged unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
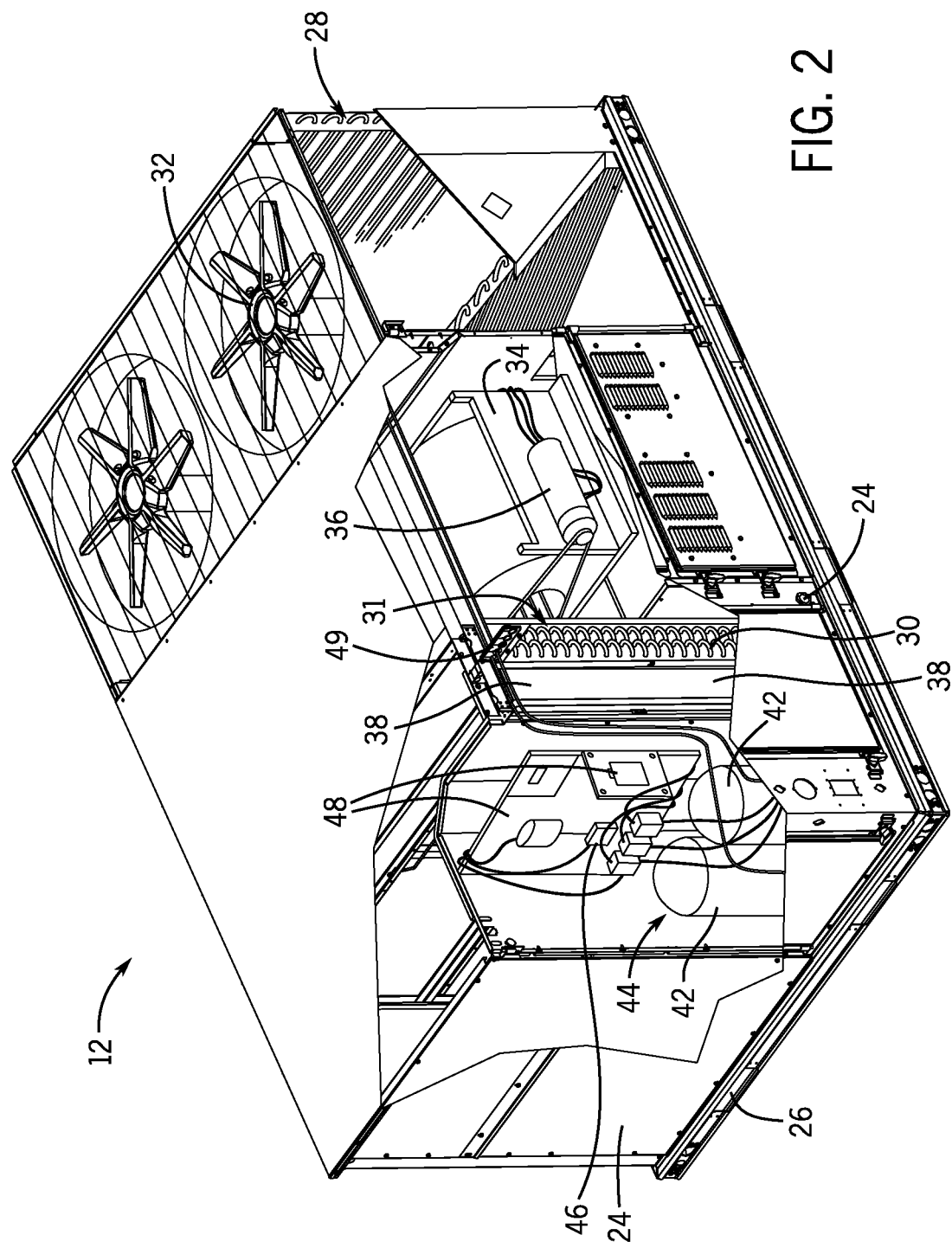
FIG. 2 is a perspective view of an embodiment of an HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
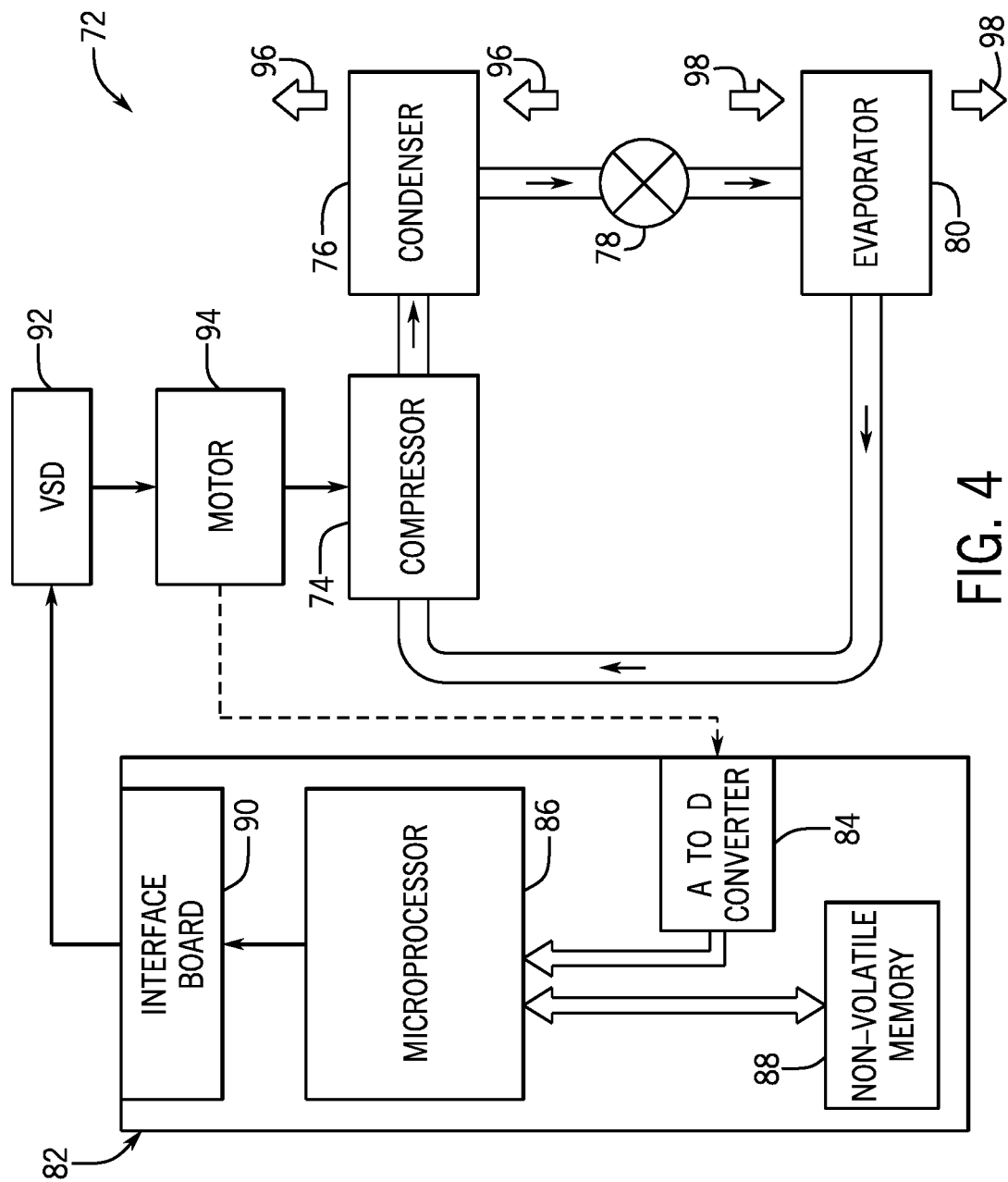
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, embodiments of the present disclosure are directed to a remote clearing system that enables dealers or other authorized personnel of the HVAC unit 12 and/or the residential heating and cooling system 50, which are referred to collectively as an HVAC system 100, to clear a lock out event without being physically present at the location of the HVAC system 100. For instance, FIG. 5 is a schematic of an embodiment of a remote clearing system 102, which includes the HVAC system 100. As shown in the illustrated embodiment of FIG. 5, the HVAC system 100 may include a control system 104 that receives feedback from sensors disposed within, and configured to monitor operating parameters of, the HVAC system 100. As such, the control system 104 sends an indicator to a user device 106 when a lock out event, such as a hard lock out or a soft lock out, occurs. In some embodiments the user device 106 includes a mobile phone, a tablet, a smart wearable device, a voice-activated computing device, a laptop computer, a desktop computer, another suitable computing device, or a combination thereof. The user device 106 is communicatively coupled to the control system 104 of the HVAC system 100 via a wireless connection, such as Bluetooth, Wi-Fi, radio frequency identification (RFID) transceivers and/or tags, ZigBee, Worldwide Interoperability for Microwave Access (WiMax), another suitable wireless connection, or a combination thereof. Additionally or alternatively, the user device 106 may be coupled to the control system 104 of the HVAC system 100 via a wired connection. In any case, the user device 106 is configured to receive and display an indicator or notification when a lock out event of the HVAC system 100 occurs.

Accordingly, the user device 106 may display the indicator to a user notifying the user that the lock out event took place. The user of the user device 106 may then provide access to a dealer to remote clear the lock out event. In some embodiments, the user of the user device 106 provides access or authorization for the dealer to remote clear the lock out event through a program, mobile application, or other suitable software installed on the user device 106. For example, the user may receive the indicator on the user device 106 and the program, mobile application, or other suitable software may prompt the user to grant access for the dealer to remote clear the lock out event. In other embodiments, the user may be prompted to grant access to the dealer to perform a remote clear any time a lock out event occurs for the HVAC system 100. The user may provide access for a dealer or other authorized user to perform a remote clear any time a lock out event occurs when the user registers or installs the program, mobile application, or other suitable software and/or when the user pairs the user device 106 with the HVAC system 100. In still further embodiments, during installation of the HVAC system 100, the control system 104 may be configured to enable the user to grant access to the dealer to perform a remote clear any time a lock out event of the HVAC system 100 occurs.

Upon granting access to the dealer, an indication may be directed to a dealer device 108 of the dealer to enable the dealer to remotely clear the lock out event. As shown in the illustrated embodiment of FIG. 5, the remote clearing system 102 includes a network 110 that enables communication between the user device 106, the dealer device 108, and/or the HVAC system 100. In some embodiments, the user is configured to grant access to the dealer to remotely clear the lock out event using the user device 106. As such, the user device 106 may communicate with the dealer device 108 via the network 110 to provide the indication to the dealer. As discussed above, in other embodiments, the control system 104 of the HVAC system 100 is configured to grant access to the dealer to perform a remote clear any time a lock out event occurs. Thus, the HVAC system 100 may also communicate with the dealer device 108 over the network 110 to provide the indication to the dealer.

Similar to the user device 106, the dealer device 108 may include a mobile phone, a tablet, a smart wearable device, a voice-activated computing device, a laptop computer, a desktop computer, another suitable computing device, or a combination thereof. Further, the dealer device 108 includes a corresponding program, mobile application, electronic mail application, or other suitable software that notifies the dealer that a lock out event has occurred to the HVAC system 100 and that the user has granted the dealer access to perform a remote clear of the lock out event. As such, the indication received by the dealer may include an electronic mail message, a push notification, a short message service (SMS) message, or another suitable indicator to notify the dealer that the user has granted access for a remote clear of a lock out event.

Additionally or alternatively, the indication includes information related to an operating history of the HVAC system 100 and/or the lock out event to enable the dealer to assess a condition of the HVAC system 100 and determine whether a remote clear of the lock out event is appropriate. For example, in some embodiments, the indication may include information related to operating parameters of the HVAC system 100 that triggered the lock out event. The indication may further include a code associated with a cause or source of the lock out event. Further still, the indication may include a lock out event history or log that enables the dealer to assess a timing of the lock out event in comparison to other lock out events of the HVAC system 100. In any case, the indication includes information that the dealer utilizes to assess whether a remote clear of the lock out event is appropriate or whether further maintenance or troubleshooting of the HVAC system 100 should occur before clearing the lock out event. Should the dealer determine that a remote clear of the lock out event is not appropriate and/or that further maintenance or troubleshooting of the HVAC system 100 should occur, the dealer may communicate with the user that a technician may be dispatched to the physical location of the HVAC system 100. Accordingly, the dealer may send a message, notification, or other indication to the user device 106 using the dealer device 108, where the message, notification, or other indication informs the user that a remote clear of the lock out event will not be performed, and that a technician may be dispatched for further assessment of the HVAC system 100.

When the dealer determines that a remote clear is appropriate for the lock out event, the dealer device 108 may display an acknowledgement notice related to the remote clear of the lock out event. For instance, the acknowledgement notice may be an acceptance of responsibility for performing the remote clear. The dealer receives the indication, which allows the dealer to assess the condition of the HVAC system 100 and determine whether a remote clear of the lock out event is appropriate based on the received information. Accordingly, the dealer accepts the acknowledgement notice in order to initiate the remote clear. Alternatively, the dealer may decline the acknowledgement notice to negate an opportunity to perform the remote clear of the lock out event.

Remote clearing of the lock out event is initiated after the dealer accepts of the acknowledgement notice. In some embodiments, the control system 104 of the HVAC system 100 stores data related to each lock out event and/or each remote clearing of a lock out event, which may be utilized to assess the condition of the HVAC system 100 during future lock out events. As such, a record of each lock out event, and whether a respective lock out event was remotely cleared, may be stored in the control system 104 and utilized for assessment of whether a remote clear should be performed for future lock out events of the HVAC system 100. Additionally or alternatively, the record of remotely cleared lock out events may be monitored and/or analyzed by a manufacturer of the HVAC system 100 to determine whether a warranty of a component of the HVAC system 100 should be covered or honored by the dealer performing remote clearing instead of the manufacturer.

FIG. 6 is a flow chart of an embodiment of a process 130 performed by the remote clearing system 102 for enabling a dealer to perform a remote clear of a lock out event. For example, at block 132, a lock out event of the HVAC system 100 is detected by the control system 104. The control system 104 then communicates with the user device 106 to notify the user associated with the user device 106 that the lock out event has occurred. As such, at block 134, the user device 106 enables the user to grant access for the dealer to remotely clear the lock out event. In some embodiments, the user may be prompted to grant access for remotely clearing a lock out event each time a lock out event occurs. In other embodiments, the user may configure a program, a mobile application, or other software of the user device 106 and/or the control system 104 to grant access for remotely clearing any time a lock out event takes place. In still further embodiments, the user may configure the program, the mobile application, or other software of the user device 106 and/or the control system 104 to grant access for remotely clearing specific types of lock out events, such as soft lock out events.

At block 136, the dealer device 108 displays an indication notifying the dealer that remote clear access has been granted by the user. As discussed above, the indication may include information related to the HVAC system 100 and/or the lock out event to enable the dealer to assess a condition of the HVAC system 100 and determine whether a remote clear of the lock out event is appropriate. When the dealer determines that the remote clear is appropriate, the dealer device 108 may display the acknowledgment notice to the dealer, as shown at block 138. Accordingly, the dealer confirms responsibility for initiating the remote clear before the remote clear is performed. As such, a program, mobile application, or other software of the dealer device 108 receives acceptance of the acknowledgement notice by the dealer, as shown at block 140. The dealer device 108 may then communicate with the control system 104 of the HVAC system 100 via the network 110 and/or the user device 106 to initiate the remote clear of the lock out event, as shown at block 142. In some embodiments, the dealer device 108 is configured to communicate directly with the control system 104 of the HVAC system 100 through the network 110. In other embodiments, the dealer device 108 communicates with the control system 104 through the user device 108 and the network 110. Additionally or alternatively, a confirmation of the remote clear of the lock out event may be displayed on the user device 106 once the remote clear is initiated.

As set forth above, embodiments of the present disclosure may provide one or more technical effects useful in reducing maintenance costs of an HVAC system for owners and/or dealers of HVAC systems. For example, the remote clearing system reduces an amount of service calls that technicians of a dealer make to clear lock out events. Specifically, the dealer may receive access to remotely clear a lock out event from a user. The dealer may then assess a condition of the HVAC system and determine whether a remote clear of the lock out event is appropriate. Upon determination that the remote clear of the lock out event is appropriate, the dealer may initiate the remote clear without being physically present at a location of the HVAC system. As such, costs of the dealer and the user associated with service calls are reduced. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system for a heating, ventilating, and air conditioning (HVAC) system, comprising:
    a control system of the HVAC system configured to initiate a lock out event of the HVAC system, wherein the lock out event is configured to effectuate at least a partial shutdown of the HVAC system;
    a user device configured to be communicatively coupled to the control system and receive feedback indicative of the lock out event of the HVAC system; and
    a dealer device configured to receive authorization from the user device to remotely clear the lock out event of the HVAC system and display an indicator of remote clear access based on the authorization, wherein the dealer device is configured to communicate with the control system of the HVAC system to remotely clear the lock out event upon receiving the authorization from the user device.

2. The system of claim 1, wherein the dealer device is configured to display an acknowledgement notice before remote clearing of the lock out event may be performed using the dealer device.

3. The system of claim 1, wherein the control system of the HVAC system is configured to store data related to the lock out event and the remote clearing of the lock out event.

4. The system of claim 1, wherein the user device is configured to display that the remote clearing of the lock out event is complete.

5. The system of claim 1, wherein the user device comprises a mobile phone, a tablet, a smart wearable device, a laptop computer, a desktop computer, or any combination thereof.

6. The system of claim 1, wherein the dealer device comprises a mobile phone, a tablet, a smart wearable device, a laptop computer, a desktop computer, or any combination thereof.

7. The system of claim 1, wherein the dealer device is configured to receive data related to the lock out event upon receiving the authorization from the user device.

8. The system of claim 7, wherein the data related to the lock out event comprises information related to an additional lock out event of the HVAC system that occurred most recently to the lock out event.

9. The system of claim 7, wherein the data related to the lock out event comprises a code indicative of a condition of the HVAC system.

10. The system of claim 7, wherein the data related to the lock out event comprises operating parameters of the HVAC system leading up to the lock out event.

11. A method for remote clearing a heating, ventilation, and air conditioning (HVAC) system, comprising:
    detecting a lock out event of the HVAC system;
    enabling a user to provide a dealer with access to remotely clear the lock out event using a user device;
    displaying an indicator of remote clear access to the dealer on a dealer device based on the user providing the dealer with access; and
    initiating a remote clearing of the lock out event after displaying the indicator of remote clear access to the dealer, wherein the dealer device communicates with a control system of the HVAC system to initiate the remote clearing of the lock out event.

12. The method of claim 11, wherein enabling the user to provide the dealer with access to remotely clear the lock out event using the user device comprises granting the dealer access for any occurrence of the lock out event.

13. The method of claim 11, comprising displaying data indicative of the HVAC system, the lock out event, or both, to the dealer with the indicator of remote clear access on the dealer device.

14. The method of claim 11, comprising storing data indicative of the remote clearing of the lock out event to the control system of the HVAC system.

15. The method of claim 11, comprising displaying an acknowledgement notice to the dealer after displaying the indicator of remote clear access and before initiating the remote clearing of the lock out event.

16. The method of claim 15, comprising confirming acceptance of the acknowledgement notice to the dealer before initiating the remote clearing of the lock out event.

17. A control system for a heating, ventilating, and air conditioning (HVAC) system, comprising:
    one or more tangible, non-transitory, machine readable media configured to store instructions executable by a processor, wherein the instructions are configured to:
    detect a lock out event of the HVAC system;
    enable a user to provider a dealer with authorization to perform a remote clearing of the lock out event using a user device;
    display an indicator of remote clear access to the dealer on a dealer device;
    display an acknowledgement notice to the dealer related to initiation of the remote clearing of the lock out event on the dealer device;
    receive acceptance of the acknowledgement notice by the dealer via the dealer device; and
    initiate the remote clearing of the lock out event upon acceptance of the acknowledgement notice, wherein the dealer device communicates with a control system of the HVAC system to initiate the remote clearing of the lock out event.

18. The control system of claim 17, wherein the instructions are configured to store data related to the remote clearing of the lock out event on the control system of the HVAC system.

19. The control system of claim 17, wherein the instructions are configured to display data indicative of the HVAC system, the lock out event, or both, to the dealer with the indicator of the remote clear access on the dealer device.

20. The control system of claim 17, wherein the instructions are configured to display that the remote clearing of the lock out event is complete on the user device.

* * * * *